(12) United States Patent
Nakashima et al.

(10) Patent No.: US 8,942,574 B2
(45) Date of Patent: Jan. 27, 2015

(54) LIGHT RECEIVING DEVICE AND LIGHT RECEIVING METHOD

(71) Applicant: Fujitsu Limited, Kawasaki-shi, Kanagawa (JP)

(72) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/089,127

(22) Filed: Nov. 25, 2013

(65) Prior Publication Data
US 2014/0301743 A1 Oct. 9, 2014

Related U.S. Application Data

(62) Division of application No. 12/977,979, filed on Dec. 23, 2010, now Pat. No. 8,649,685.

(30) Foreign Application Priority Data

Jan. 8, 2010 (JP) ................................. 2010-003246

(51) Int. Cl.
*H04B 10/00* (2013.01)
*H04B 10/61* (2013.01)

(52) U.S. Cl.
CPC ........ *H04B 10/6165* (2013.01); *H04B 10/6162* (2013.01); *H04B 10/6164* (2013.01); *H04B 10/6161* (2013.01)
USPC .............. 398/208; 398/15; 398/173; 398/159

(58) Field of Classification Search
CPC ................................................ H04B 10/6163
USPC ................... 398/155, 159, 173, 208
See application file for complete search history.

(56) References Cited

U.S. PATENT DOCUMENTS 7,027,741 B2   4/2006 Marutani et al.
7,627,252 B2 * 12/2009 Sun et al. ...................... 398/155

FOREIGN PATENT DOCUMENTS

EP   0812075 A2   12/1997
EP   1959590 A2   8/2008

(Continued)

OTHER PUBLICATIONS

Gagnon, Sebastien Ly D. et al., "Coherent Detection of Optical Quadrature Phase-Shift Keying Signals With Carrier Phase Estimation", Journal of Lightwave Technology, vol. 24, No. 1, Jan. 2006.

(Continued)

*Primary Examiner* — Danny Leung
(74) *Attorney, Agent, or Firm* — Fujitsu Patent Center

(57) ABSTRACT

A light receiving device includes: a converter digitalizing an analog signal with a given sampling clock frequency, the analog signal being obtained through a photoelectric conversion of a received optical signal; a plurality of fixed distortion compensators compensating an output signal of the converter for waveform distortion with a fixed compensation amount that is different from each other; a plurality of phase shift detector circuits detecting a sampling phase shift from an output signal of the plurality of the fixed distortion compensators; a phase-adjusting-amount determiner determining a sampling phase adjusting amount with use of an output signal of the plurality of the phase shift detector circuits; and a phase adjusting circuit reducing a phase difference between the sampling clock frequency and the received optical signal based on a determination result of the phase-adjusting-amount determiner.

13 Claims, 13 Drawing Sheets

(56) References Cited

FOREIGN PATENT DOCUMENTS

| EP | 2017980 A1 | 1/2009 |
|---|---|---|
| EP | 2101425 A1 | 9/2009 |

OTHER PUBLICATIONS

Krummrich, P. M. et al., "Extremely fast (microsecond timescale) polarization changes in high speed long haul WDM transmission systems", OFC 2004, Feb. 2004.

Tanimura, T. et al., "A Synchronization Method for AD Conversion Sampling Timing in Digital Coherent Receiver", Sep. 2007 (includes English-language Abstract).

Zibar, Darko et al., "Analysis and Dimensioning of Fully Digital Clock Recovery for 112 Gb/s Coherent Polmux QPSK Systems", ECOC 2009, Sep. 20-24, 2009.

"Extended European Search Report" mailed by EPO and corresponding to European application No. 10197368.3 on Apr. 13, 2011.

USPTO, (Leung) Notice of Allowance and Notice of Allowability, Oct. 16, 2013, in U.S. Appl. No. 12/977,979 [allowed].

USPTO, (Leung) Non-Final Rejection, Apr. 23, 2013, in parent U.S. Appl. No. 12/977,979 [allowed].

USPTO, (Leung) Restriction Requirement, Dec. 3, 2012, in parent U.S. Appl. No. 12/977,979 [allowed].

* cited by examiner

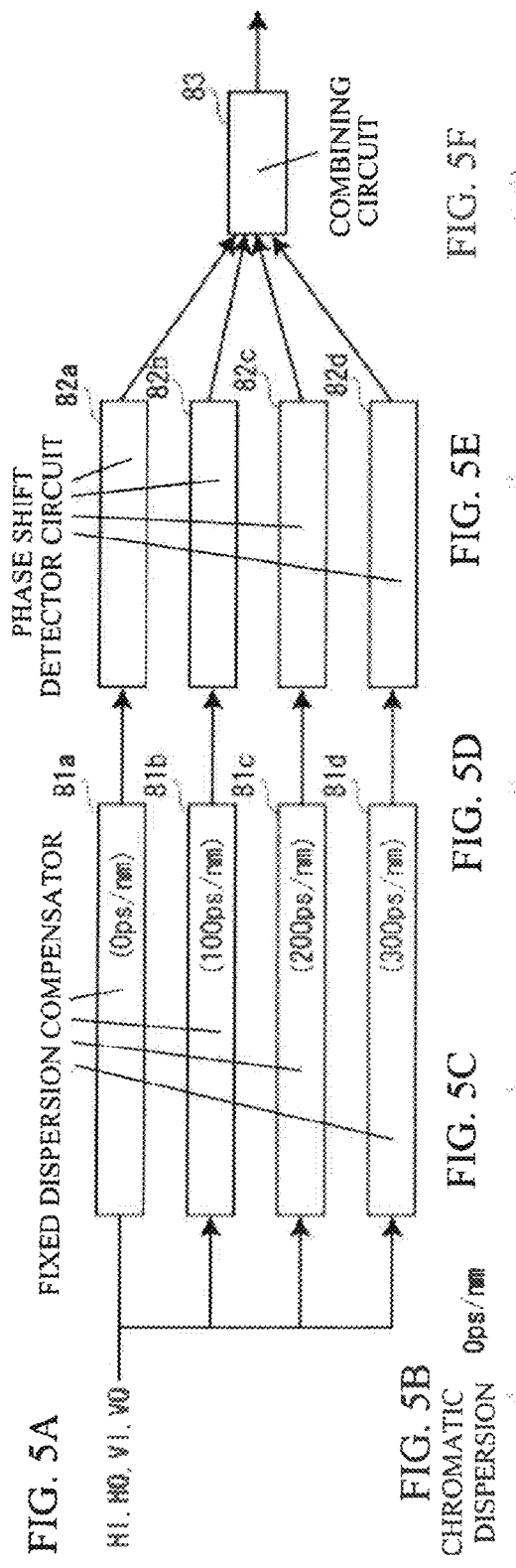

FIG. 9A
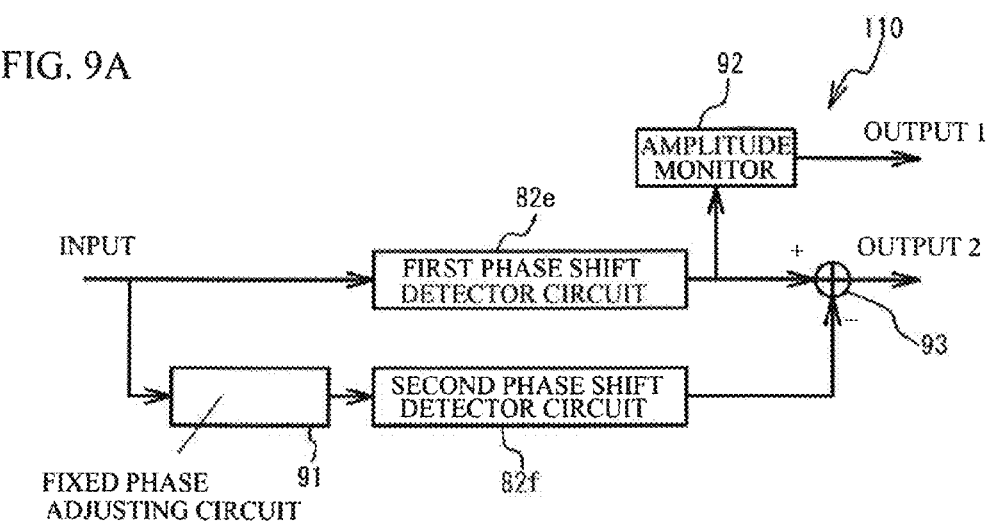
FIG. 9B OUTPUT OF DETECTOR CIRCUIT
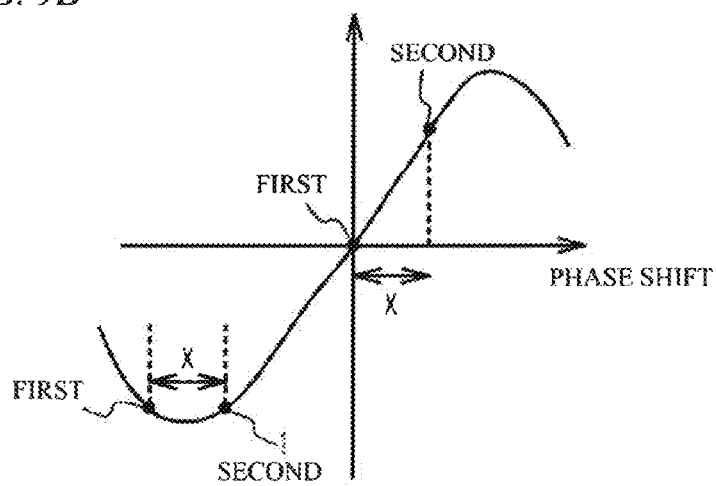
FIG. 9C
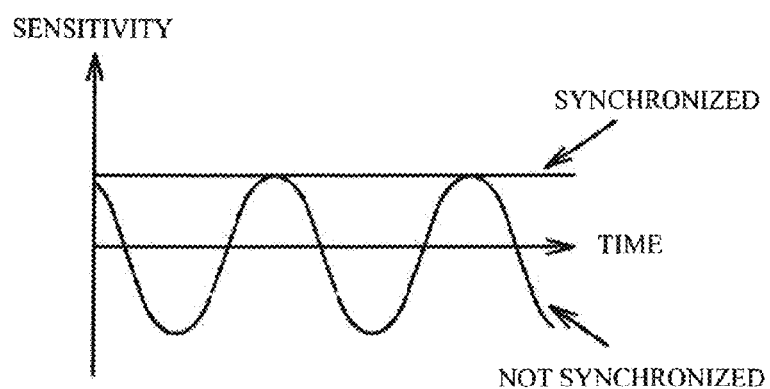

LIGHT RECEIVING DEVICE AND LIGHT RECEIVING METHOD

CROSS-REFERENCE TO RELATED APPLICATION

This application is a divisional of application Ser. No. 12/977,979, filed Dec. 23, 2010, which is based upon and claims the benefit of priority of the prior Japanese Patent Application No. 2010-003246, filed on Jan. 8, 2010, the entire contents of which are incorporated herein by reference.

FIELD

A certain aspect of embodiments described herein relates to a light receiving device and a light receiving method.

BACKGROUND

There is a demand for a main line optical communication system having a high capacity, because an internet traffic is increased. An optical signal to noise ratio (OSNR) tolerance is degraded when a bit rate per one wavelength is enlarged. In this case, a signal quality may be degraded more because of chromatic dispersion of a transmission path, polarization mode dispersion, waveform distortion caused by non-linear effect or the like. Therefore, a digital coherent receiving method has attracted attention because the method is expected to improve the OSNR tolerance and waveform distortion tolerance of a transmission path. D. Ly-Gagnon, IEEE JLT, vol. 24, pp. 12-21, 2006 discloses the method.

The digital coherent receiving method is a method where optical intensity and phase information are extracted with a coherent receiving method, and the extracted optical intensity and the extracted phase information are digitalized by analog-to-digital convertor (ADC), and the received signal is demodulated in a digital signal processing circuit by digitalized signal. The digital coherent receiving method has favorable characteristics with respect to a high-bit-rate optical transmission, because the digital coherent receiving method improves the OSNR tolerance with the coherent receiving method and compensates for waveform distortion with the digital signal processing circuit.

However, Darko Zibar et al, ECOC 2009, 7. 3. 4 discloses that the digital coherent receiving method has a problem that a sampling phase shift detector circuit has a low tolerance to waveform distortion caused by chromatic dispersion, polarization mode dispersion or the like, although the digital coherent receiving method has high performance with respect to waveform distortion compensation with a digital signal processing. Especially, P. M. Krummrich et. al, OFC 2004, FI3 discloses that the polarization mode dispersion of a transmission of a path fluctuates speedily because of fluctuation of polarization condition of the transmission path. There is a demand for a sampling phase shift detecting method that may tolerate fluctuation of polarization mode dispersion in operation and has high tolerance with respect to the waveform distortion.

SUMMARY

According to an aspect of the present invention, there is provided a light receiving device comprising: a converter digitalizing an analog signal with a given sampling clock frequency, the analog signal being obtained through a photoelectric conversion of a received optical signal; a plurality of fixed distortion compensators compensating an output signal of the converter for waveform distortion with a fixed compensation amount that is different from each other; a plurality of phase shift detector circuits detecting a sampling phase shift from an output signal of the plurality of the fixed distortion compensators; a phase-adjusting-amount determiner determining a sampling phase adjusting amount with use of an output signal of the plurality of the phase shift detector circuits; and a phase adjusting circuit reducing a phase difference between the sampling clock frequency and the received optical signal based on a determination result of the phase-adjusting-amount determiner.

According to an aspect of the present invention, there is provided a light receiving device comprising: a converter digitalizing an analog signal with a given sampling clock frequency, the analog signal being obtained through a photoelectric conversion of a received optical signal; a plurality of fixed distortion compensators compensating an output signal of the converter for waveform distortion with a fixed compensation amount that is different from each other; a plurality of compensation amount detector detecting a distortion compensation amount based on a phase-shift-detection sensitivity of each output signal of the plurality of the fixed distortion compensators; a distortion compensator compensating for distortion with a distortion compensation amount detected by the compensation amount detector; a phase-adjusting-amount determiner determining a sampling phase adjusting amount with use of an output signal of the phase shift detector circuit; and a phase adjusting circuit reducing a phase difference between the sampling clock frequency and the received optical signal based on a determination result of the phase-adjusting-amount determiner.

According to an aspect of the present invention, there is provided a light receiving method comprising: digitalizing an analog signal with a given sampling clock frequency, the analog signal being obtained through a photoelectric conversion of a received optical signal; compensating an output signal obtained in the digitalizing for waveform distortion with a fixed compensation amount that is different from each other; detecting a sampling phase shift from each output signal obtained in the compensating; determining a sampling phase adjusting amount with use of an output signal obtained in the detecting; and reducing a phase difference between the sampling clock frequency and the received optical signal based on a determination result of the determining.

According to an aspect of the present invention, there is provided a light a light receiving method comprising: digitalizing an analog signal with a given sampling clock frequency, the analog signal being obtained through a photoelectric conversion of a received optical signal; compensating an output signal obtained in the digitalizing for waveform distortion with a fixed compensation amount that is different from each other; detecting a distortion compensation amount based on a phase-shift-detection sensitivity of each output signal obtained in the compensating for the waveform; compensating for distortion with a distortion compensation amount detected in the detecting; determining a sampling phase shift amount with use of an output signal obtained in the compensating for the distortion; and reducing a phase difference between the sampling clock frequency and the received optical signal based on a determination result of the determining.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 5A through 5K visually illustrate chromatic dispersion compensation;

FIGS. 9A through 9C illustrate a sensitivity detector detecting sensitivity with use of a phase shift detector circuit;

DESCRIPTION OF EMBODIMENTS

The following is a description of embodiments of the present invention, with reference to the accompanying drawings.

First Embodiment

Figure 1:
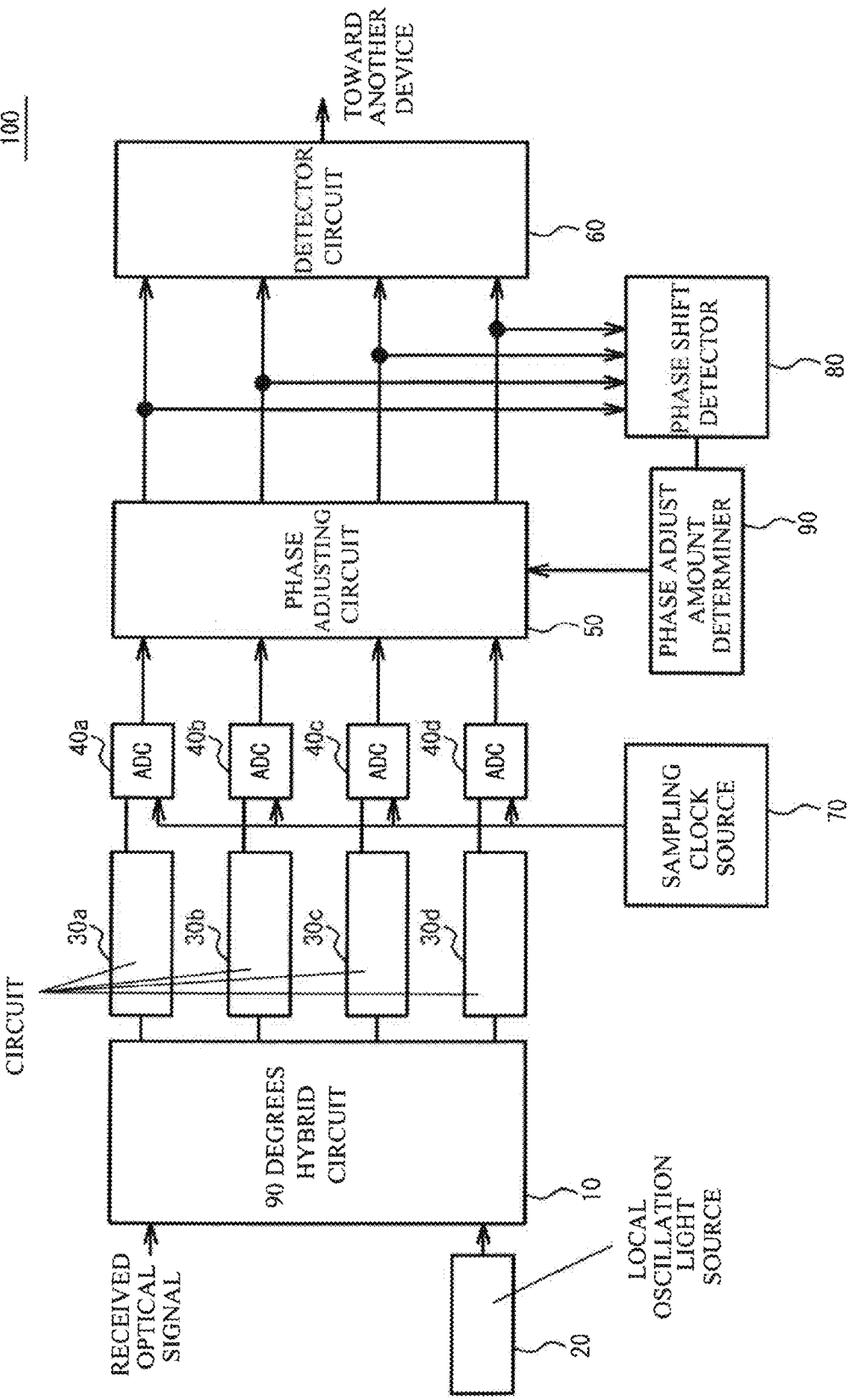
FIG. 1 illustrates a block diagram of a light receiving device in accordance with a first embodiment.

FIG. 1 illustrates a block diagram of a light receiving device 100 in accordance with a first embodiment. As illustrated in FIG. 1, the light receiving device 100 includes a 90 degrees hybrid circuit 10, a local oscillation light source 20, a photoelectric conversion circuits 30a through 30d, an analog/digital converters 40a through 40d, a phase adjusting circuit 50, a detector circuit 60, a sampling clock source 70, a phase shift detector 80, and a phase-adjusting-amount determiner 90.

Figure 2:
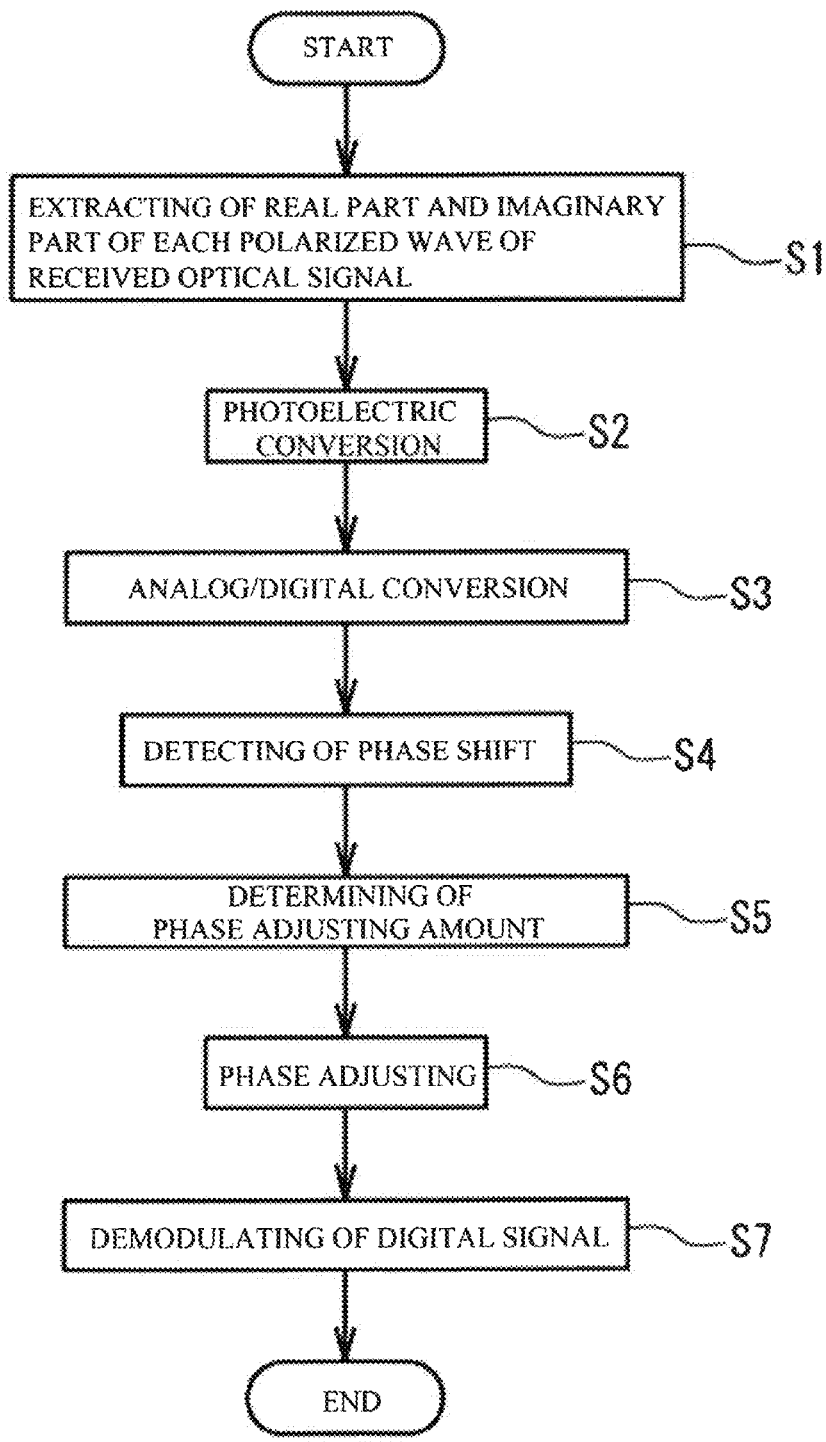
FIG. 2 illustrates a flowchart of an example of an operation of the light receiving device.

FIG. 2 illustrates a flowchart of an example of an operation of the light receiving device 100. A description will be given of an outline of the operation of the light receiving device 100 with reference to FIG. 1 and FIG. 2. The 90 degrees hybrid circuit 10 receives a received optical signal fed into the light receiving device 100 and a local oscillation optical signal output by the local oscillation light source 20.

The 90 degrees hybrid circuit 10 mixes the received optical signal and the local oscillation optical signal per two polarized waves at right angles to each other, and outputs an optical signal of a real part (I-phase) and an imaginary part (Q-phase) of polarized waves (H polarized wave and V polarized wave) (Step S1).

The photoelectric conversion circuits 30a through 30d convert the optical signals of an I-phase signal and a Q-phase signal of two polarized waves at right angles to each other into an electrical signal (Step S2). In the embodiment, the photoelectric conversion circuit 30a converts the H-I signal into an electrical signal. The photoelectric conversion circuit 30b converts the H-Q signal into an electrical signal. The photoelectric conversion circuit 30c converts the V-I signal into an electrical signal. The photoelectric conversion circuit 30d converts the V-Q signal into an electrical signal.

The analog/digital converters 40a through 40d convert an output electrical signal of the photoelectric conversion circuits 30a through 30d into a digital signal in accordance with a timing (sampling frequency) of an input signal from the sampling clock source 70, and inputs the digital signal into the phase adjusting circuit 50 (Step S3). The phase adjusting circuit 50 adjusts a sampling phase of the digital signals output by the analog/digital converters 40a through 40d and outputs the adjusted digital signal. The phase shift detector 80 detects a phase shift (phase error) between a modulation frequency of the received optical signal and the sampling frequency with use of the output signal of the phase adjusting circuit 50 (Step S4). The phase-adjusting-amount determiner 90 determines a sampling phase adjusting amount based on the phase shift obtained in Step S4 (Step S5). The phase adjusting circuit 50 adjusts the sampling phase based on the sampling phase adjusting amount obtained in Step S5, and inputs the adjusted signal into the detector circuit 60 (Step S6). The detector circuit 60 is a digital coherent detector circuit including a waveform equalizer, a decoder, an error corrector and so on, and demodulates the input digital signal (Step S7).

Figure 3:
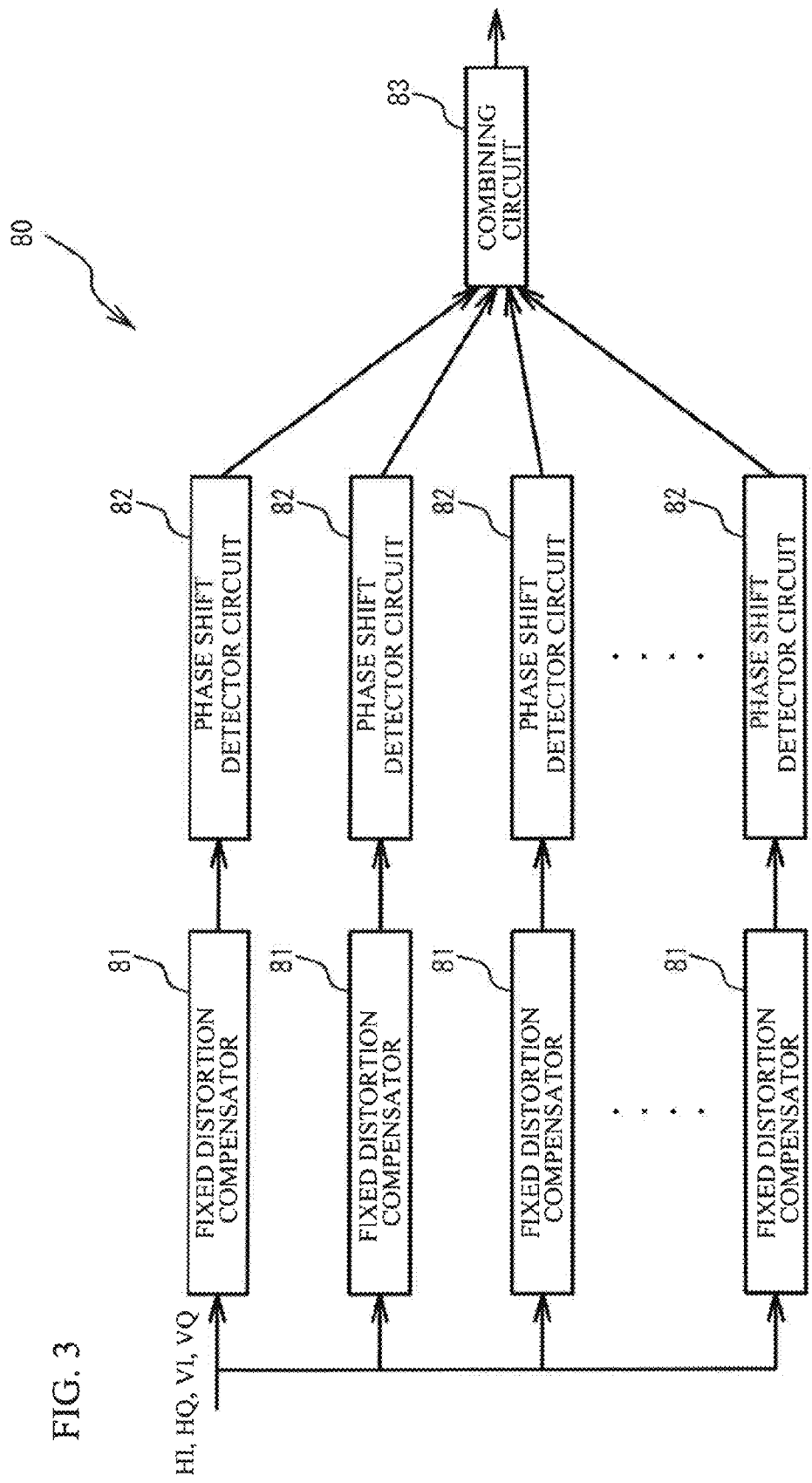
FIG. 3 illustrates a block diagram for describing details of a phase shift detector.

A description will be given of each portion. FIG. 3 illustrates a block diagram for describing details of the phase shift detector 80. As illustrated in FIG. 3, the phase shift detector 80 has n ("n" is an integer and is two or more) number of fixed distortion compensators 81 having a compensation amount that is different from each other, n number of phase shift detector circuits 82, and a combining circuit 83. Each fixed distortion compensator 81 receives four signals of the H-I signal, the H-Q signal, the V-I signal and the V-Q signal.

Each phase shift detector circuit 82 is a sampling phase shift detector circuit detecting the sampling phase shift at the sampling clock source 70, and is provided according to each fixed distortion compensator 81. In concrete, an output signal of a first fixed distortion compensator 81 is input into a first phase shift detector circuit 82. An output signal of a n-th fixed distortion compensator 81 is input into a n-th phase shift detector circuit 82. Each phase shift detector circuit 82 detects the sampling phase shift based on the output signal of each fixed distortion compensator 81, and inputs the detection result into the combining circuit 83.

Each fixed distortion compensator 81 is a distortion compensator circuit having a compensation amount that is different from each other. Therefore, waveform distortion amount of a signal output by the fixed distortion compensator circuit is different from each other according to the waveform distortion amount of the received optical signal. That is, the output signal of the fixed distortion compensator circuit having a reverse compensation amount with respect to waveform distortion of the received optical signal is a signal without waveform distortion. The output signal of the fixed distortion compensator circuit having a compensation amount that is difference from the reverse compensation amount with respect to the waveform distortion of the received optical signal is a signal having a large waveform distortion.

This allows inputting of a signal having a small waveform distortion into at least one of the n number of sampling phase shift detector circuits. Thus, it is possible to detect an adequate sampling phase shift amount even if the waveform distortion of the received optical signal is large.

The combining circuit 83 is a circuit averaging the input signals. The combining circuit 83 may be a circuit that simply averages the input signals or a circuit that weighted-averages the input signals.

The combining circuit 83 inputs information concerning a phase shift obtained by the averaging into the phase-adjusting-amount determiner 90. The phase-adjusting-amount determiner 90 determines the sampling phase adjusting amount through a calculation or the like based on the information concerning the phase shift. The phase adjusting circuit 50 adjusts the sampling phase of the output digital signals of the analog/digital converters 40a through 40d to the sampling phase detected based on the phase-adjusting-amount determiner 90. The phase adjusting circuit 50 therefore can reduce the difference between the sampling phase of the sampling clock source 70 and the modulation frequency of the received optical signal. That is, the phase adjusting circuit 50 can reduce the sampling phase shift.

Figure 4A:
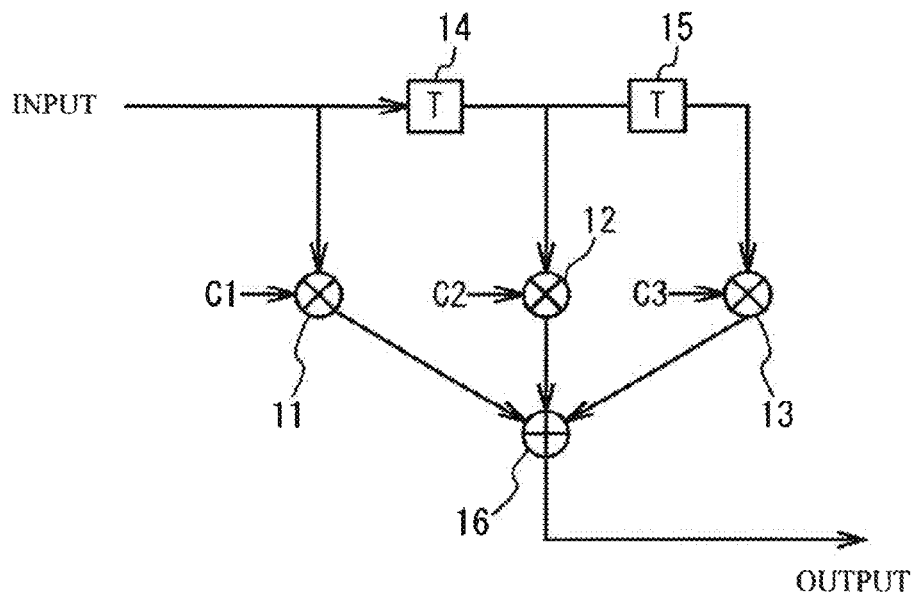
FIGS. 4A and 4B illustrate details of fixed distortion compensation.

Next, a description will be given of details of the fixed distortion compensation. FIG. 4A illustrates a block diagram for describing details of a FIR (Finite Impulse Response) type of the fixed distortion compensator 81. As illustrated in FIG. 4A, for example, the FIR type of the fixed distortion compensator 81 has a first multiplication portion 11, a second multiplication portion 12, a third multiplication portion 13, a first delay portion 14, a second delay portion 15, and an addition portion 16. The first multiplication portion 11, the second multiplication portion 12 and the third multiplication portion 13 have a fixed multiplication coefficient that is different from each other.

The first delay portion 14 sets a predetermined delay amount on an input signal to the fixed distortion compensator 81 and outputs the input signal having the delay. The second delay portion 15 sets a predetermined delay amount on the signal output by the first delay portion 14 and outputs the signal having the delay. The first multiplication portion 11 inputs a multiplication result between the signal input to the fixed distortion compensator 81 and the multiplication coefficient of the first multiplication portion 11 into the addition portion 16. The second multiplication portion 12 inputs a multiplication result between the signal output by the first delay portion 14 and the multiplication coefficient of the second multiplication portion 12 into the addition portion 16. The third multiplication portion 13 inputs a multiplication result between the signal output by the second delay portion 15 and the multiplication coefficient of the third multiplication portion 13 into the addition portion 16.

The addition portion 16 outputs a summation of the multiplication results of the first multiplication portion 11, the second multiplication portion 12 and the third multiplication portion 13. With the processes, the fixed distortion compensator 81 compensates for chromatic dispersion with respect to the input signal, when the multiplication coefficients of the first multiplication portion 11, the second multiplication portion 12 and the third multiplication portion 13 are coefficients according to the chromatic dispersion.

It is assumed that a multiplication coefficient C1 is set in the first multiplication portion 11 fixedly, a multiplication coefficient C2 is set in the second multiplication portion 12 fixedly, and a multiplication coefficient C3 is set in the third multiplication portion 13 fixedly. And, it is assumed that a delay amount Ts is set in the first delay portion 14 and the second delay portion 15 as a sampling timing.

In this case, the coefficient according to the chromatic dispersion is shown as the following equation (1). In the equation (1), "f" is a carrier frequency, "C" is a light speed, "D" is a chromatic dispersion compensation amount, "ω" is an angular frequency, and "j" is an imaginary unit.

[Equation (1)]

$$C_k = \frac{1}{2\pi}\int_{-\pi}^{\pi} \exp\left[j \cdot \left(\frac{\omega}{T_S}\right)^2 \cdot \frac{C}{2\pi f^2} \cdot \frac{D}{2} + j\omega k\right] d\omega \quad (1)$$

Figure 4B:
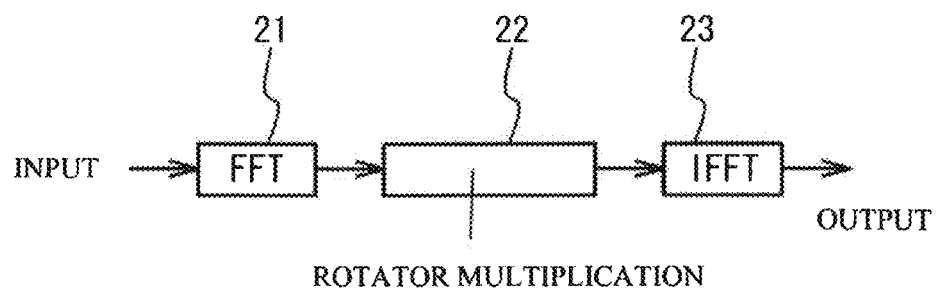

FIG. 4B illustrates a block diagram for describing details of the fixed distortion compensator 81 in a frequency range with use of FFT (Fast Fourier Transform). As illustrated in FIG. 4B, for example, the FFT type of the fixed distortion compensator 81 includes a FFT portion 21, a rotator multiplication portion 22 and an IFFT portion 23.

A signal input into the fixed distortion compensator 81 is subjected to Fast Fourier Transform in the FFT portion 21. The rotator multiplication portion 22 multiplies the signal subjected to Fast Fourier Transform by a rotator according to transfer function $H_{CD}$ of chromatic dispersion of the frequency range. The transfer function $H_{CD}$ is shown as the following equation (2). The output signal of the rotator multiplication portion 22 is subjected to a reverse Fourier Transform in the IFFT portion 23. Thus, the fixed distortion compensator 81 compensates for chromatic dispersion with respect to the input signal.

In the equation (2), "f" is a carrier frequency, "C" is a light speed, "D" is a chromatic dispersion compensation amount, "ω" is an angular frequency, and "j" is an imaginary unit.

[Equation (2)]

$$H_{CD}(\omega) = e^{-j\left(\frac{C \times D}{4\pi f^2}\omega^2\right)} \quad (2)$$

FIGS. 5A through 5K illustrate an example of a case where the fixed distortion compensator 81 is a circuit compensating for chromatic dispersion. FIG. 5A illustrates an example of the phase shift detector 80 of FIG. 1. FIG. 5B through FIG. 5K illustrate a constellation diagram of a received optical signal and an output of the fixed distortion compensator in a case where transmission path chromatic dispersion is 0 ps/nm and 200 ps/nm, in a case of Quadrature Phase Shift Keying (QPSK).

The phase shift detector 80 of FIG. 5A has four fixed distortion compensators 81a through 81d and four phase shift detectors 82a through 82d. The chromatic dispersion compensation amount of each of the fixed distortion compensators 81 through 81d is 0 ps/nm, 100 ps/nm, 200 ps/nm and 300 ps/nm.

FIG. 5B illustrates a waveform of a received optical signal having chromatic dispersion amount of 0 ps/nm. The chromatic dispersion compensation amount of the fixed distortion compensator 81a is 0 ps/nm (=chromatic dispersion amount of the received optical signal). Therefore, the output waveform of the fixed distortion compensator 81a is the same as FIG. 5B, as illustrated in FIG. 5C. The chromatic dispersion compensation amount of the fixed distortion compensator 81b is 100 ps/nm (≠the chromatic dispersion amount of the received optical signal). Therefore, the output waveform of the fixed distortion compensator 81b is distorted compared to the fixed distortion compensator 81a as illustrated in FIG. 5D. As illustrated in FIG. 5E and FIG. 5F, the output waveform of the fixed distortion compensator is distorted as a difference between the chromatic dispersion of the received optical signal and the chromatic dispersion compensation amount gets larger.

FIG. 5G illustrates a waveform of the received optical signal having the chromatic dispersion of 200 ps/nm. The chromatic dispersion compensation amount of the fixed distortion compensator 81a is 0 ps/nm (≠the chromatic dispersion amount of the received optical signal). Therefore, the output waveform of the fixed distortion compensator 81a is distorted as illustrated in FIG. 5H. As illustrated in FIGS. 5I and 5K, the distortion of the output waveform of the fixed distortion compensator is reduced as the difference between the chromatic dispersion compensation amount of the fixed distortion compensator 81b and the fixed distortion compensator 81d and the chromatic dispersion amount of the received optical signal gets smaller. The chromatic dispersion compensation amount of the fixed distortion compensator 81c is equal to the wavelength distortion amount of the received optical signal. Therefore, the output waveform of the fixed distortion compensator 81c is the same as FIG. 5G as illustrated in FIG. 5J.

The chromatic dispersion compensation amount of each fixed distortion compensator is different from each other. Therefore, the waveform distortion of the signal output by the fixed distortion compensators 81a through 81d is different from each other. The type of the fixed distortion compensators 81a through 81d and a step size of the chromatic dispersion compensation amount are determined according to the dispersion tolerance of the phase shift detector circuit 82.

There is a case where the H-polarized wave and the V-polarized wave have a different chromatic dispersion distortion because of a high order polarization mode dispersion. In this case, a different chromatic dispersion compensation amount is applied to the H-polarized wave and the V-polarized wave. For example, a circuit determining dispersion compensation amount may use only the H-polarized wave. A compensation circuit of which dispersion compensation amount is 0 ps/nm may be omitted.

Figure 6:
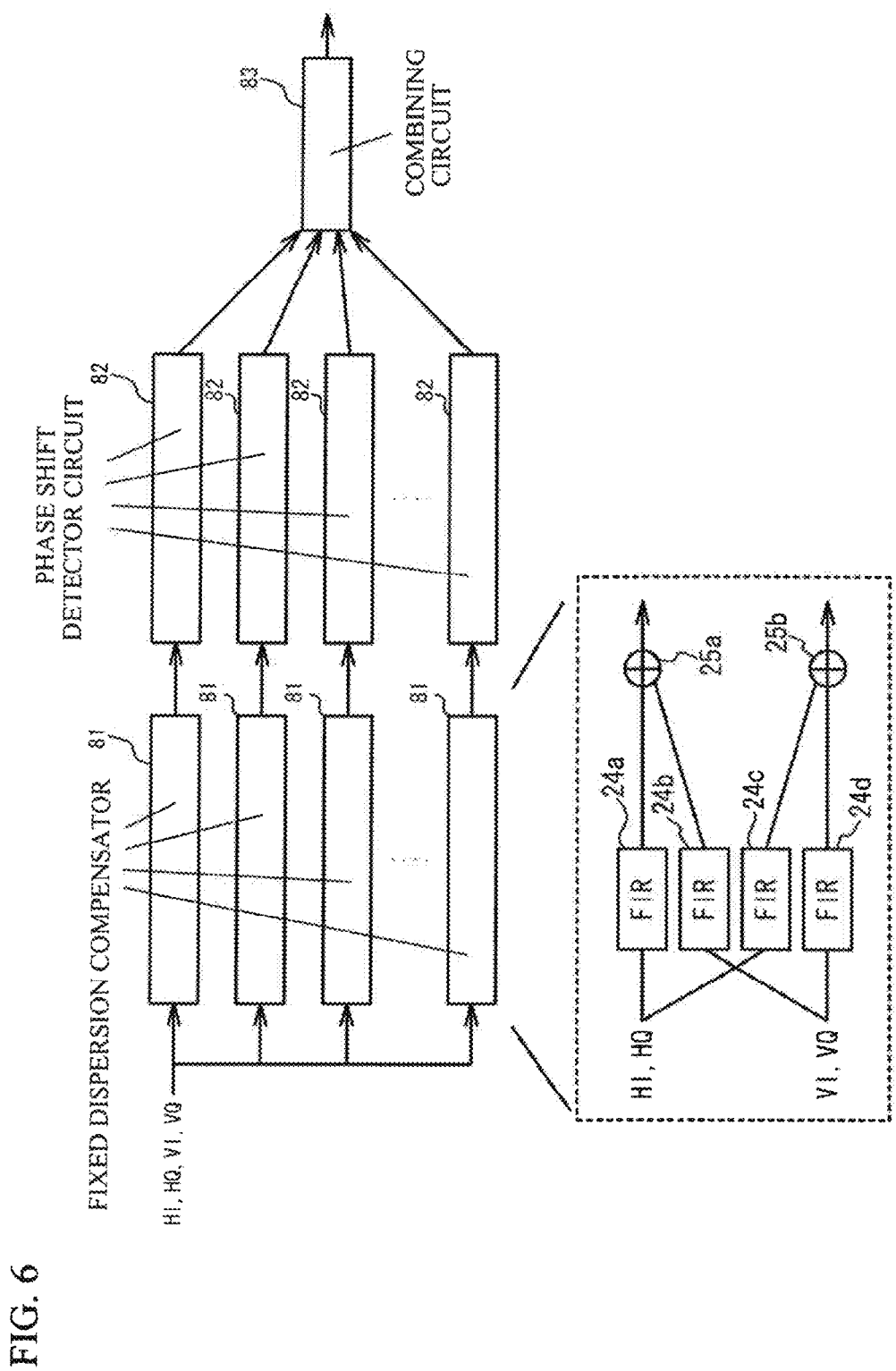
FIG. 6 illustrates an example of a fixed distortion compensator.

There is a case where there is a demand for chromatic dispersion compensation, polarization mode dispersion (DGD: Differential Group Delay) compensation and polarized wave division as the waveform distortion compensation. FIG. 6 illustrates an example of the fixed distortion compensator 81 in the case. As illustrated in FIG. 6, each of the fixed distortion compensators 81 includes four FIR filters 24a through 24d and two addition portions 25a and 25b. The FIR filters 24a through 24d have the same structure as the FIR type fixed distortion compensator described in FIG. 4A.

The H-I signal and the H-Q signal obtained through the polarized wave division at a polarization beam splitter or the like are input into the FIR filter 24a and the FIR filter 24c. The V-I signal and the V-Q signal obtained through the polarized wave division are input into the FIR filter 24b and the FIR filter 24d. The FIR filters 24a through 24d output a result subjected to the distortion compensation. The addition portion 25a adds an output signal of the FIR filter 24a to an output signal of the FIR filter 24b, and outputs a signal subjected to the addition. The addition portion 25b adds an output signal of the FIR filter 24c to an output signal of the FIR filter 24d, and outputs a signal subjected to the addition.

The dispersion is compensated by setting multiplication coefficients of multiplication portions included in the FIR filters 24a through 24d to be different from each other. The DGD compensation and the polarized wave division are achieved at a desirable angle by optimizing the multiplication coefficients of the multiplication portions included in the FIR filters 24a through 24d.

Figure 7:
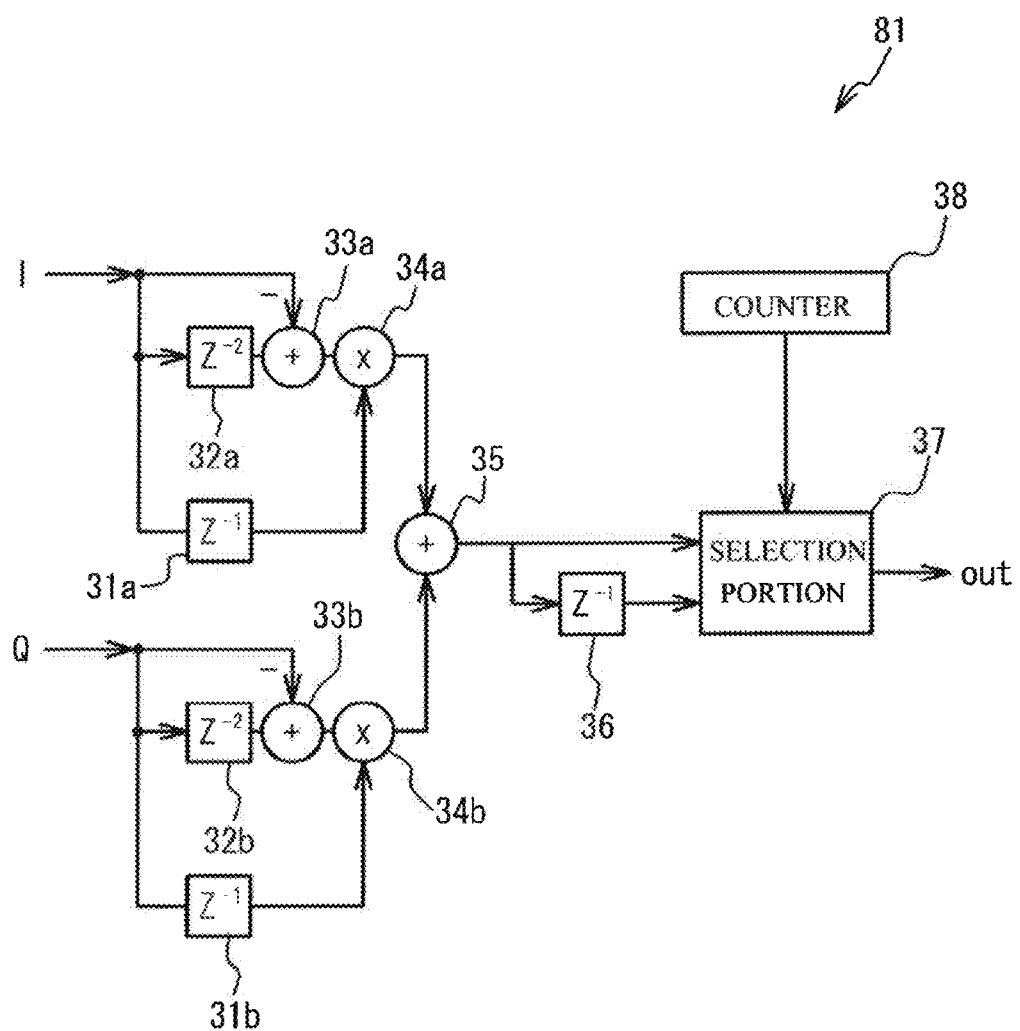
FIG. 7 illustrates a block diagram of a phase shift detector circuit.

Next, a description will be given of details of the phase shift detector circuit 82. For example, a description will be given of a Gardner type of phase shift detector circuit disclosed in F. M. Gardner, Trans. Comm., 1986, pp. 423-429. FIG. 7 illustrates a block diagram of the phase shift detector circuit 82. As illustrated in FIG. 7, the phase shift detector circuit 82 includes a first delay portions 31a and 31b, second delay portions 32a and 32b, a subtraction portions 33a and 33b, a multiplication portions 34a and 34b, an addition portion 35, a delay portion 36, a selection portion 37 and a counter 38.

The first delay portions 31a and 31b and the delay portion 36 are a delay portion setting a delay amount that is one symbol of an input signal. The second delay portions 32a and 32b are a delay portion setting a delay amount that is two symbols of an input signal. The counter 38 is a one-bit counter, and generates "0" and "1" in order. The selection portion 37 selects an output signal according to a signal from the counter 38. The phase shift detector circuit 82 is made on an assumption that an input I-phase signal and an input Q-phase signal are sampled twice in one symbol time.

The I-phase signal is input to a minus side of the subtraction portion 33a and is input to the first delay portion 31a and the second delay portion 32a. The first delay portion 31a sets one symbol delay amount on the I-phase signal and inputs the signal into the multiplication portion 34a. The second delay portion 32a sets two symbols delay amount on the I-phase signal and inputs the signal into a plus side of the subtraction portion 33a. The subtraction portion 33a subtracts the I-phase signal from a signal input from the second delay portion 32a, and inputs the subtraction result into the multiplication portion 34a. The multiplication portion 34a multiplies the signal input from the first delay portion 31a by the signal input from the subtraction portion 33a, and inputs the multiplication result into the addition portion 35.

The Q-phase signal is input to a minus side of the subtraction portion 33b and is input to the first delay portion 31b and the second delay portion 32b. The first delay portion 31b sets one symbol delay amount on the Q-phase signal and inputs the signal into the multiplication portion 34b. The second delay portion 32b sets two symbols delay amount on the Q-phase signal and inputs the signal into a plus side of the subtraction portion 33b. The subtraction portion 33b subtracts the Q-phase signal from a signal input from the second delay portion 32b, and inputs the subtraction result into the multiplication portion 34b. The multiplication portion 34b multiplies the signal input from the first delay portion 31b by the signal input from the subtraction portion 33b, and inputs the multiplication result into the addition portion 35.

The addition portion 35 adds the multiplication result of the multiplication portion 34a to the multiplication result of the multiplication portion 34b, and inputs the addition result into the delay portion 36 and the selection portion 37. The delay portion 36 sets one symbol delay on the signal input from the addition portion 35, and input the signal into the selection portion 37. The selection portion 37 outputs one of the output value of the addition portion 35 and the output value of the one symbol delay portion 36, only when a signal input from the counter 38 is "1". The output signal of the selection portion 37 is a value according to a phase shift amount between the modulation frequency of the received optical signal and the sampling clock frequency. The smaller the phase shift amount is, the closer to zero the output value is.

Figure 8:
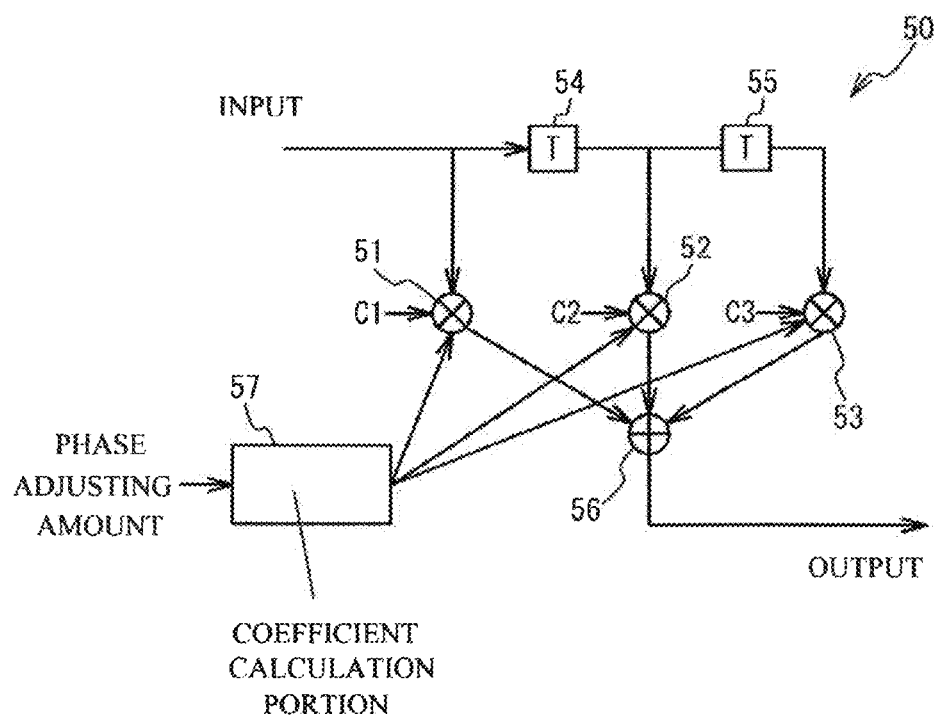
FIG. 8 illustrates a block diagram for describing details of a FIR type phase adjusting circuit.

FIG. 8 illustrates a block diagram for describing details of a FIR type of the phase adjusting circuit 50. As illustrated in FIG. 8, for example, the phase adjusting circuit 50 includes a first multiplication portion 51, a second multiplication portion 52, a third multiplication portion 53, a first delay portion 54, a second delay portion 55, an addition portion 56, and a coefficient calculation portion 57. The first multiplication portion 51, the second multiplication portion 52, and the third multiplication portion 53 have a multiplication coefficient set by the coefficient calculation portion 57.

The first delay portion 54 sets a given delay amount on a signal input to the phase adjusting circuit 50, and outputs the signal. The second delay portion 55 sets a given delay amount on a signal output by the first delay portion 54, and outputs the signal. The first multiplication portion 51 multiplies the signal input to the phase adjusting circuit 50 by the multiplication coefficient set in the first multiplication portion 51, and inputs the multiplication result into the addition portion 56. The second multiplication portion 52 multiplies a signal output by the first delay portion 54 by the multiplication coefficient set in the second multiplication portion 52, and inputs the multiplication result into the addition portion 56. The third multiplication portion 53 multiplies a signal output by the second delay portion 55 by the multiplication coefficient set in the third multiplication portion 53, and input the multiplication result into the addition portion 56. The addition portion 56 calculates a total of the multiplication results of the first multiplication portion 51, the second multiplication portion 52 and the third multiplication portion 53, and outputs the total.

The coefficient calculation portion 57 calculates the multiplication coefficients of the first multiplication portion 51, the second multiplication portion 52 and the third multiplication portion 53 according to the phase adjusting amount of the phase adjusting circuit 50. Each of the calculated multiplication coefficients is set in the first multiplication portion 51, the second multiplication portion 52 and the third multiplication portion 53. Therefore, the phase adjusting circuit 50 sets the phase adjusting amount on a signal input thereto. The multiplication coefficient is calculated with a linear interpolation, a quadratic function, or a higher order interpolation equation.

In the embodiment, a plurality of the fixed distortion compensators 81 on which a different distortion amount is set are used. This allows a solution of the problem that the phase shift detector circuit has low tolerance with respect to the waveform distortion. Therefore, a sampling phase shift detecting having high tolerance with respect to the waveform distortion of the received optical signal is achieved. And, the sampling phase shift is reduced.

The smaller the waveform distortion of a signal input to the phase shift detector circuit 82 is, the higher the detection sensitivity of the phase shift detector circuit 82 is. In contrast, the larger the waveform distortion is, the lower the detection sensitivity of the phase shift detector circuit 82 is. Accordingly, the detection sensitivity of the phase shift detector circuit 82 gets lower when the distortion amount of the signal input to the fixed distortion compensator 81 is different from the compensation amount of the fixed distortion compensator 81. And so, a description will be given of a case where a phase shift is detected based on the detection sensitivity of the phase shift detector circuit 82.

FIG. 9A illustrates a block diagram of a sensitivity detector 110 detecting sensitivity with use of the phase shift detector circuit 82. As illustrated in FIG. 9A, the sensitivity detector 110 includes a fixed phase adjusting circuit 91, a first phase shift detector circuit 82e, a second phase shift detector circuit 82f, an amplitude monitor 92, and a subtraction portion 93.

The fixed phase adjusting circuit 91 adds a fixed phase amount X to a signal input to the sensitivity detector 110 and outputs the addition result. The first phase shift detector circuit 82e and the second phase shift detector circuit 82f have the same structure as the phase shift detector circuit 82. A signal input to the sensitivity detector 110 is input to the first phase shift detector circuit 82e. A signal from the fixed phase adjusting circuit 91 is input to the second phase shift detector circuit 82f. The output signal of the first phase shift detector circuit 82e is input to the amplitude monitor 92 and is input to a plus side of the subtraction portion 93. The output signal of the second phase shift detector circuit 82f is input to a minus side of the subtraction portion 93.

The amplitude monitor 92 detects amplitude of a signal output by the first phase shift detector circuit 82e, and outputs the detected amplitude. The subtraction portion 93 subtracts the output signal of the second phase shift detector circuit 82f from the output signal of the first phase shift detector circuit 82e, and outputs the subtraction result.

FIG. 9B illustrates an output of the sensitivity detector 110. In FIG. 9B, a horizontal axis indicates a phase shift, and a vertical axis indicates an output intensity of the phase shift detector circuit. The output intensity fluctuates according to the phase shift amount. When the phase shift amount is zero, the output intensity is zero.

Here, it is assumed that the phase shift of a signal input to the sensitivity detector 110 is zero. In this case, as illustrated in FIG. 9B, the output intensity of the first phase shift detector circuit 82e is zero, too. The output intensity of the second phase shift detector circuit 82f is a plus value as illustrated in FIG. 9B, because the fixed phase amount X is added in the fixed phase adjusting circuit 91. Thus, output intensity difference or an inclination of the output intensity is detected as sensitivity.

There is a case where a difference between the output intensity of the first phase shift detector circuit 82e and the output intensity of the second phase shift detector circuit 82f is zero as illustrated in FIG. 9B even if the fixed phase amount X is added in the fixed phase adjusting circuit 91, when the sampling phase is not synchronized with the modulation frequency of the received optical signal. In this case, the detected sensitivity gets smaller even if a signal input to the sensitivity detector 110 has a phase shift. And so, the detection result of the amplitude monitor 92 is used in order to detect the sensitivity.

FIG. 9C illustrates a detection result of the amplitude monitor 92. In FIG. 9C, a horizontal axis indicates an elapsed time, and a vertical axis indicates detection sensitivity of the phase shift detector circuit. The detection sensitivity of the sensitivity detector 110 is approximately constant, when the phase shift between the sampling clock of the sampling clock source 70 and the modulation frequency of the received optical signal. On the other hand, the detection sensitivity of the sensitivity detector 110 fluctuates periodically, when the sampling clock of the sampling clock source 70 is not synchronized with the modulation frequency of the received optical signal. The amplitude monitor 92 detects the amplitude value as the detection sensitivity.

For example, the combining circuit 83 of FIG. 3 may average the output values of phase shift detector circuits 82 other than a phase shift detector circuit 82 detecting sensitivity that is lower than a predetermined value. In this case, it is possible to avoid an effect such as a noise caused by reduction of a phase-shift-detection sensitivity caused by large waveform distortion. And, the phase shift detection accuracy gets higher. Alternatively, the phase-adjusting-amount determiner 90 may detect the sampling phase shift based on the output of the phase shift detector circuit 82 detecting the maximum sensitivity.

Second Embodiment

Figure 10:
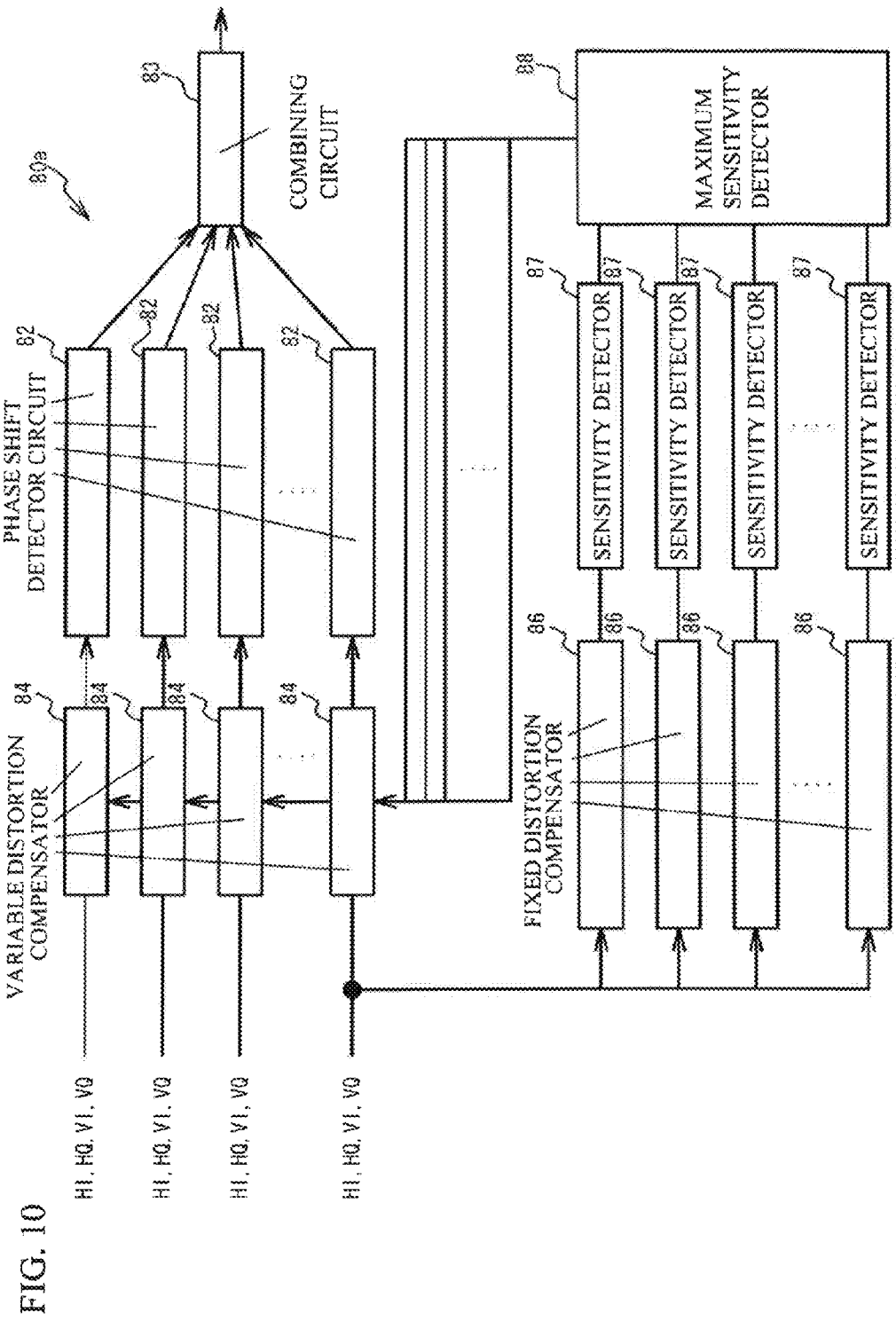
FIG. 10 illustrates a block diagram of a phase shift detector in accordance with a second embodiment.

FIG. 10 illustrates a block diagram of a phase shift detector 80a in accordance with a second embodiment. As illustrated in FIG. 10, the phase shift detector 80a has n variable distortion compensators 84 instead of the n fixed distortion compensators 81. The phase shift detector 80a has m (m is an integer and is two or more) number of fixed distortion compensators 86, m number of sensitivity detectors 87 and a maximum sensitivity detector 88. The same components have the same reference numerals in order to avoid a duplicated explanation. In the embodiment, the maximum sensitivity detector 88 acts as a compensation amount detector, and the variable distortion compensator 84 acts as a compensation amount corrector.

Each of the variable distortion compensators 84 receives a H-I signal, a H-Q signal, a V-I signal and a V-Q signal. The signals input to one of the variable distortion compensators 84 is input to each of the fixed distortion compensators 86. The fixed distortion compensator 86 has the same structure as the fixed distortion compensator 81 of FIG. 3.

Each of the sensitivity detectors 87 detects sensitivity of a signal output by the fixed distortion compensator 86. The maximum sensitivity detector 88 detects a maximum sensitivity of sensitivities detected by each sensitivity detector 87, and thereby detects a distortion compensation amount according to the maximum sensitivity. The maximum sensitivity detector 88 inputs the distortion compensation amount into each variable distortion compensator 84. Each of the variable distortion compensators 84 updates the distortion compensation amount into the distortion compensation amount input from the maximum sensitivity detector 88. Each of the variable distortion compensator 84 compensates for waveform distortion based on the updated distortion compensation amount. Each of the phase shift detector circuit 82 detects a phase shift of a signal output by each variable distortion compensator 84, and inputs the detected phase shift into the combining circuit 83. The combining circuit 83 averages signals input thereto. The combining circuit 83 may be a circuit that simply averages the input signals or a circuit that weighted-averages the input signals.

In the embodiment, a compensation amount of the variable distortion compensator 84 is determined with a feed forward control. Therefore, the light receiving device 100 speedily conforms the fluctuation of the waveform distortion of the received optical signal. In the embodiment, the maximum sensitivity detector 88 detects the maximum sensitivity of the sensitivities detected by each of the sensitivity detector 87. However, the structure is not limited. For example, any sensitivity larger than a given value may be detected instead of the maximum sensitivity.

Modified Embodiment

Figure 11:
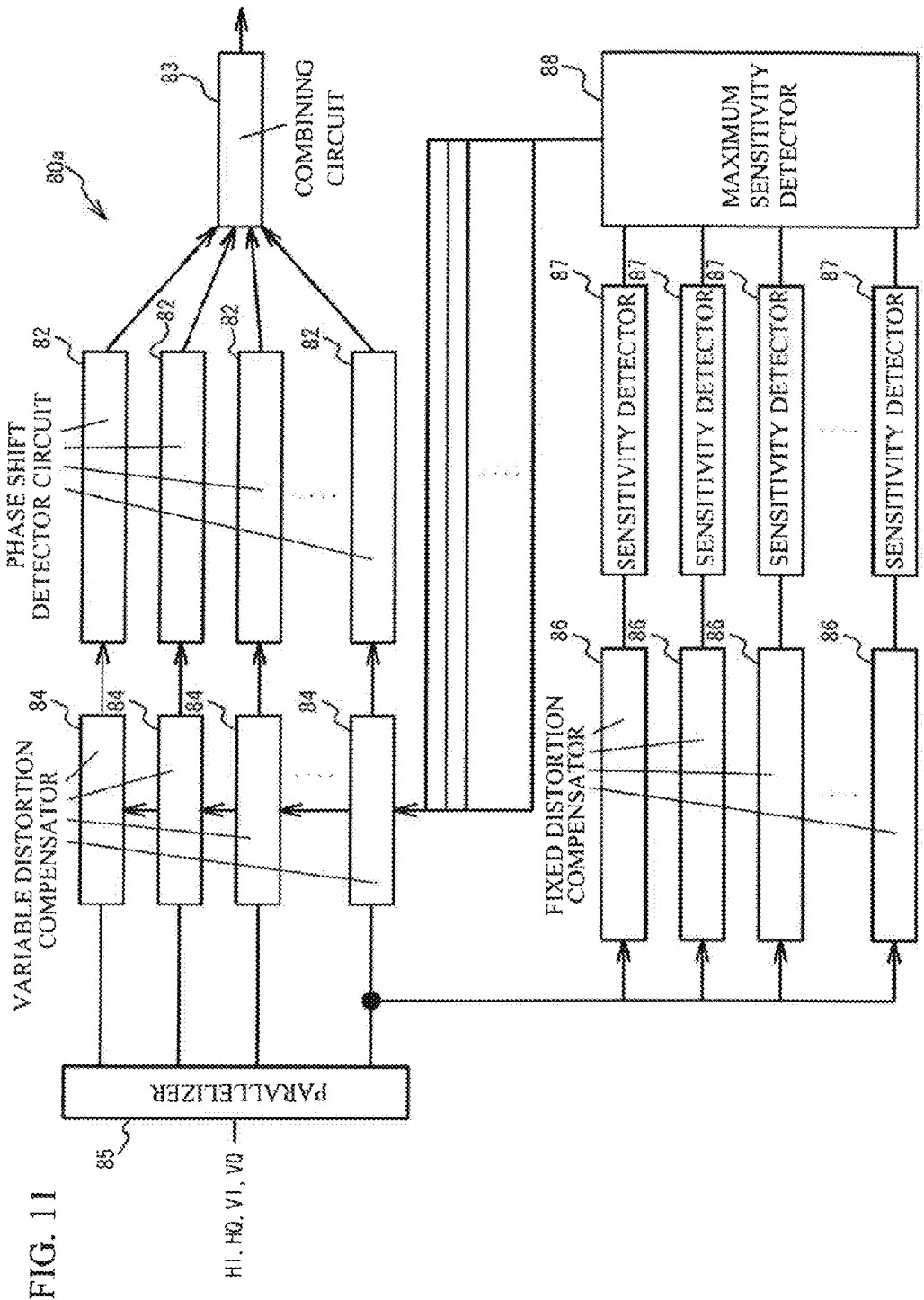
FIG. 11 illustrates a block diagram of a modified embodiment of the second embodiment.

The phase shift detector 80a may have a parallelizer 85. FIG. 11 illustrates an example where the parallelizer 85 is provided. In FIG. 11, the parallelizer 85 is provided inside of the phase shift detector 80a. However, the parallelizer 85 may be arranged just behind the analog/digital converters 40a through 40d. In this case, the phase adjusting circuit 50 and the detector circuit 60 process with a parallelized signal.

The parallelizer 85 parallelizes four signals of the H-I signal, the H-Q signal, the V-I signal and the V-Q signal with a time division method or the like. In FIG. 11, the parallelizer 85 parallelizes each of the four signals into n signals with a time division method, and inputs each parallelized signal into each variable distortion compensator 84. One of the parallelized signals is input to each fixed distortion compensator 86. With the modified embodiment, it is possible to reduce a circuit size of a distortion compensation circuit that is enlarged because of parallelization of a signal.

Third Embodiment

Figure 12:
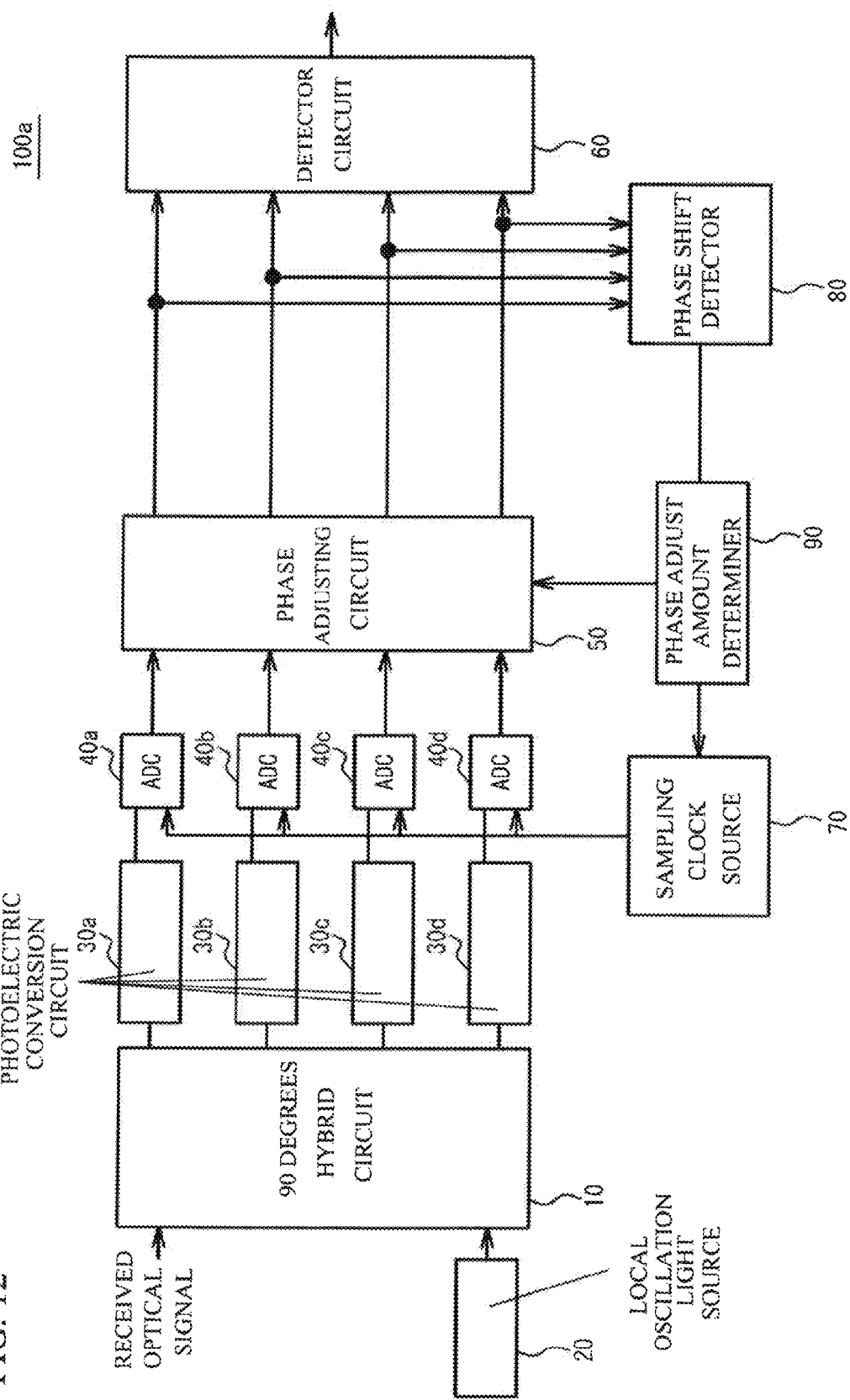
FIG. 12 illustrates a block diagram of a light receiving device in accordance with a third embodiment.

FIG. 12 illustrates a block diagram of a light receiving device 100a in accordance with a third embodiment. As illustrated in FIG. 12, the light receiving device 100a is different from the light receiving device 100 of FIG. 1 in a point that the feed back value of the phase-adjusting-amount determiner 90 is input to the sampling clock source 70. The sampling clock source 70 corrects the sampling clock frequency according to the feed back value of the phase-adjusting-amount determiner 90. Thereby, a phase difference between the sampling clock of the analog/digital converter 40a through 40d and the modulation frequency of the received optical signal is reduced. In the embodiment, the phase adjusting circuit 50 compensates for phase fluctuation of the modulation frequency of a high-speed received optical signal that is not synchronized through the sampling clock frequency control. However, only the phase-adjusting-amount determiner 90 may be feed-back controlled with respect to the sampling clock source 70 without a feed-back control of the phase-adjusting-amount determiner 90 with respect to the phase adjusting circuit 50.

Fourth Embodiment

Figure 13:
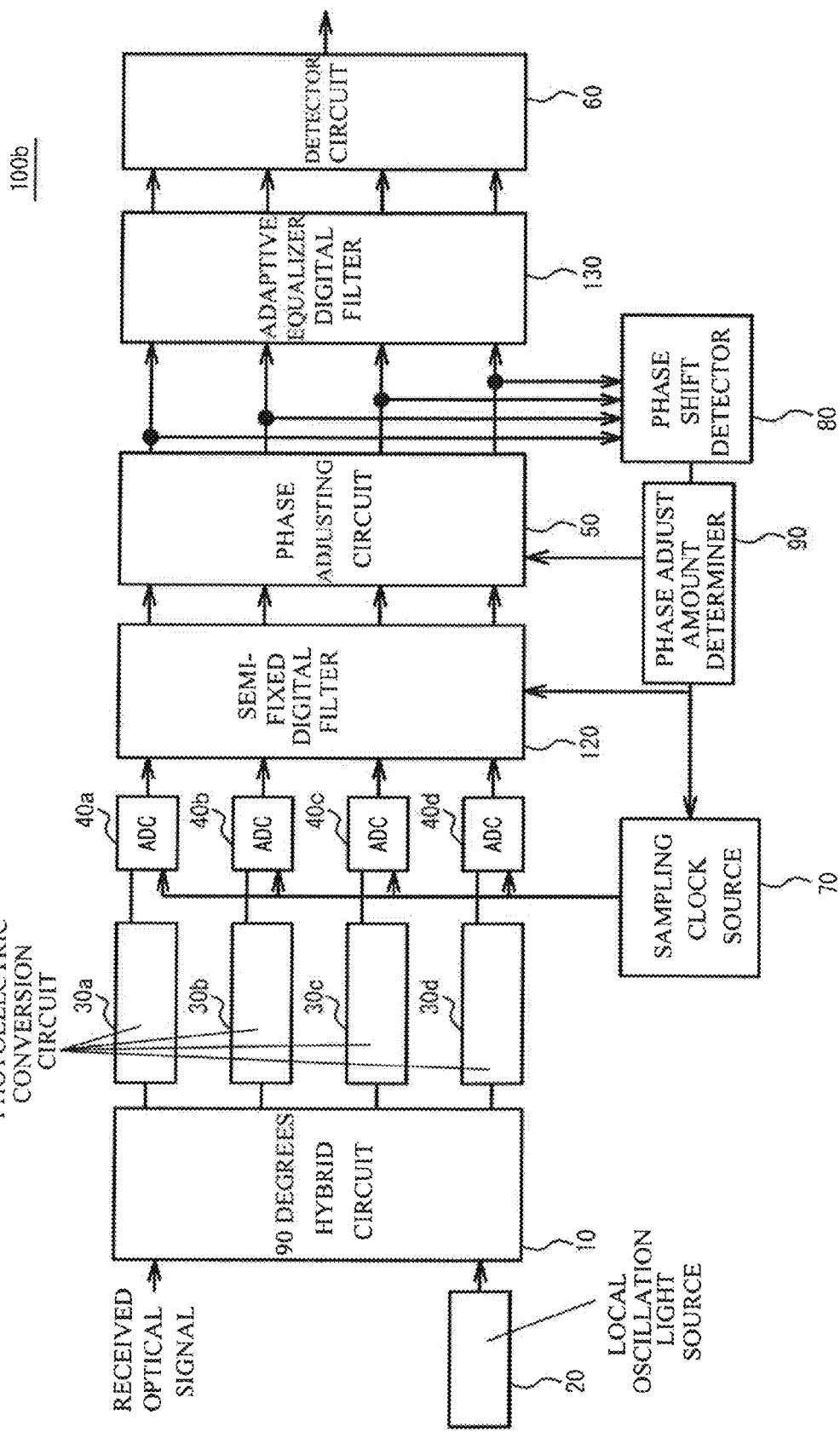
FIG. 13 illustrates a block diagram of a light receiving device in accordance with a fourth embodiment.

FIG. 13 illustrates a block diagram of a light receiving device 100b in accordance with a fourth embodiment. As illustrated in FIG. 13, the light receiving device 100b is different from the light receiving device 100 of FIG. 1 in a point that a semi-fixed digital filter 120 is provided between the analog/digital converters 40a through 40d and the phase adjusting circuit 50 and in a point that an adaptive equalization type digital filter 130 is provided between the phase adjusting circuit 50 and the detector circuit 60.

The semi-fixed digital filter 120 compensates for a transmission path chromatic dispersion that does not fluctuate greatly. It is therefore possible to receive a distortion caused by large chromatic dispersion. The adaptive equalization type digital filter 130 compensates for residual chromatic dispersion in the semi-fixed digital filter 120, waveform distortion fluctuating in time (polarization mode dispersion, polarization fluctuation or the like). The chromatic dispersion processed in the adaptive equalization type digital filter 130 or the phase shift detector 80 is the residual chromatic dispersion of the semi-fixed digital filter. Therefore, the circuit size is reduced.

The variable distortion compensator 84 of the phase shift detector 80a in accordance with the second embodiment may be used in the fourth embodiment if an optimal distortion compensation value of the phase shift detector 80 is set on the semi-fixed digital filter 120.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A light receiving device comprising:
a converter to digitalize an analog signal with a given sampling clock frequency, the analog signal being obtained through a photoelectric conversion of a received optical signal;
a plurality of fixed distortion compensators to compensate an output signal of the converter for waveform distortion with a fixed compensation amount that is different from each other;
a plurality of compensation amount detector to detect a distortion compensation amount based on a phase-shift-detection sensitivity of each output signal of the plurality of the fixed distortion compensators;
a distortion compensator to compensate for distortion with a distortion compensation amount detected by the compensation amount detector;
a phase-adjusting-amount determiner to determine a sampling phase adjusting amount with use of an output signal of the phase shift detector circuit; and
a phase adjusting circuit to reduce a phase difference between the sampling clock frequency and the received optical signal based on a determination result of the phase-adjusting-amount determiner.

2. The light receiving device as claimed in claim 1 further comprising a semi-fixed digital filter to compensate an output signal of the converter for waveform distortion,
wherein:
compensation amount of the semi-fixed digital filter is corrected based on a compensation amount detected by the compensation amount detector; and
the plurality of the fixed distortion compensators compensate an output signal of the semi-fixed digital filter for waveform distortion with a fixed compensation amount that is different from each other.

3. The light receiving device as claimed in claim 1, wherein the fixed distortion compensator compensates for chromatic dispersion as the waveform distortion compensation.

4. The light receiving device as claimed in claim 1, wherein the phase adjusting circuit includes a digital phase adjusting circuit adjusting a phase of an output signal of the converter.

5. The light receiving device as claimed in claim 1, wherein the phase adjusting circuit includes a corrector correcting a sampling clock frequency of the converter.

6. A light receiving method comprising:
digitalizing an analog signal with a given sampling clock frequency, the analog signal being obtained through a photoelectric conversion of a received optical signal;
compensating an output signal obtained in the digitalizing for waveform distortion with a fixed compensation amount that is different from each other;
detecting a distortion compensation amount based on a phase-shift-detection sensitivity of each output signal obtained in the compensating for the waveform;
compensating for distortion with a distortion compensation amount detected in the detecting;
determining a sampling phase shift amount with use of an output signal obtained in the compensating for the distortion; and
reducing a phase difference between the sampling clock frequency and the received optical signal based on a determination result of the determining.

7. The light receiving method as claimed in claim 6 further comprising correcting compensation amount of a semi-fixed digital filter compensating an output signal obtained in the converting for waveform distortion with a compensation amount detected in the detecting,
wherein waveform distortion is compensated for with respect to an output signal of the semi-fixed digital filter with a fixed compensation amount that is different from each other in the compensating for the waveform.

8. The light receiving method as claimed in claim 6 further comprising adjusting a phase of a signal obtained in the converting.

9. The light receiving method as claimed in claim 7 further comprising adjusting a phase of a signal obtained in the converting.

10. The light receiving method as claimed in claim 6, wherein chromatic dispersion is compensated for as waveform distortion compensation in the compensating for the waveform.

11. The light receiving method as claimed in claim 7, wherein chromatic dispersion is compensated for as waveform distortion compensation in the compensating for the waveform.

12. The light receiving method as claimed in claim 6 further comprising correcting a sampling clock frequency in the converting based on a determination result of the determining.

13. The light receiving method as claimed in claim 7 further comprising correcting a sampling clock frequency in the converting based on a determination result of the determining.

* * * * *